United States Patent
Mlinar et al.

(10) Patent No.: US 6,756,146 B2
(45) Date of Patent: Jun. 29, 2004

(54) APPARATUS AND METHOD FOR AUTOMATICALLY STACKING FUEL CELL MATERIAL LAYERS

(75) Inventors: John Russell Mlinar, Coon Rapids, MN (US); Gary William Schukar, North Oaks, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 247 days.

(21) Appl. No.: 10/115,516

(22) Filed: Apr. 3, 2002

(65) Prior Publication Data

US 2003/0188413 A1 Oct. 9, 2003

(51) Int. Cl.[7] .......................... H01M 8/10; B23P 19/04
(52) U.S. Cl. ............................ 429/32; 429/38; 429/39; 29/722; 29/730; 29/743; 29/782
(58) Field of Search ............................ 429/32, 38, 39; 29/722, 730, 743, 782

(56) References Cited

U.S. PATENT DOCUMENTS

| | | | |
|---|---|---|---|
| 2,710,234 A | 6/1955 | Hansen | |
| 3,178,041 A | 4/1965 | Wheat et al. | |
| 3,285,112 A | 11/1966 | Dale et al. | |

(List continued on next page.)

FOREIGN PATENT DOCUMENTS

| | | |
|---|---|---|
| BE | 1007774 A3 | 10/1995 |
| DE | 26 10 628 A | 9/1977 |
| EP | 0 654 347 A1 | 11/1994 |
| FR | 2 456 613 A | 12/1980 |
| GB | 1 084 597 A | 9/1967 |
| GB | 2101098 A | 1/1983 |
| JP | 55-98040 | 7/1980 |
| JP | 57-93854 | 6/1982 |
| JP | 62-244830 | 10/1987 |
| JP | 403-128851 | 5/1991 |
| JP | 403-128853 | 5/1991 |
| JP | 96335462 A | 12/1996 |
| JP | 10-166014 | 6/1998 |
| JP | 11 273663 A | 10/1999 |
| JP | 11 297314 A | 10/1999 |
| JP | 99292327 A | 10/1999 |

OTHER PUBLICATIONS

U.S. patent application Ser. No. 10/115,778, filed Apr. 3, 2002, Hirsch, D. I., co–pending application.
U.S. patent application Ser. No. 10/115,777, filed Apr. 3, 2002, Ripley, S. A., co–pending application.
U.S. patent application Ser. No. 10/116,323, filed Apr. 3, 2002, Ripley, S. A., co–pending application.

(List continued on next page.)

Primary Examiner—Hoa Van Le
(74) Attorney, Agent, or Firm—Mark A. Hollingsworth; Philip Y. Dahl

(57) ABSTRACT

Stacking porous and non-porous material layers involves applying vacuum to a first porous layer to stabilize same relative to a support structure. The support structure and/or a non-porous layer are moved to establish contact between the non-porous layer and the first porous layer. The first porous and non-porous layers define a sub-assembly. While applying vacuum to the sub-assembly, one or both of the support structure and a second layer are moved to establish contact between the second layer and the non-porous layer. Vacuum applied to the sub-assembly maintains positional stability of the sub-assembly layers relative to the support structure while the second layer is moved into contact with the non-porous layer. Vacuum is subsequently removed to facilitate transporting of the material layer stack. Material layers of a fuel cell, including first and second fluid transport layers and a membrane, are well suited for automated stacking.

43 Claims, 8 Drawing Sheets

U.S. PATENT DOCUMENTS

| | | |
|---|---|---|
| 3,359,046 A | 12/1967 | Dryden |
| 3,380,788 A | 4/1968 | Wilcock |
| 3,477,558 A | 11/1969 | Fleischauer |
| 3,861,259 A | 1/1975 | Hitch |
| 3,946,920 A | 3/1976 | Jordan et al. |
| 4,143,871 A | 3/1979 | Blessing |
| 4,168,772 A | 9/1979 | Eberle |
| 4,236,814 A | 12/1980 | Tonkin |
| 4,286,467 A | 9/1981 | Kober |
| 4,360,260 A | 11/1982 | Eloranta et al. |
| 4,381,596 A | 5/1983 | Simonton et al. |
| 4,534,549 A | 8/1985 | Eberle |
| 4,591,139 A | 5/1986 | Engelbart |
| 4,676,862 A | 6/1987 | Kuehnert |
| 4,728,093 A | 3/1988 | Eberle |
| 4,784,380 A | 11/1988 | Eberle |
| 4,819,928 A | 4/1989 | Osborn et al. |
| 4,887,858 A | 12/1989 | Gazzarrini |
| 5,031,002 A | 7/1991 | Yaguchi |
| 5,048,182 A | 9/1991 | Robbins, III |
| 5,061,337 A | 10/1991 | Fraser |
| 5,063,415 A | 11/1991 | Ariyama |
| 5,078,375 A | 1/1992 | Steidinger |
| 5,133,543 A | 7/1992 | Eitel et al. |
| 5,456,871 A | 10/1995 | Harada et al. |
| 5,556,499 A | 9/1996 | Clough |
| 5,596,897 A | 1/1997 | Payne, Jr. et al. |
| 5,762,753 A | 6/1998 | Clough |
| 5,783,024 A | 7/1998 | Forkert |
| 5,791,185 A | 8/1998 | Bodnar |
| 5,910,378 A * | 6/1999 | Debe et al. ............... 429/42 |
| 5,989,747 A | 11/1999 | Tanaka et al. |
| 6,007,660 A | 12/1999 | Forkert |
| 6,059,003 A | 5/2000 | Wittkopf |
| 6,066,409 A | 5/2000 | Ronne et al. |
| 6,159,327 A | 12/2000 | Forkert |
| 6,224,203 B1 | 5/2001 | Wotton et al. |
| 6,241,839 B1 | 6/2001 | Yoshino et al. |
| 6,347,585 B1 | 2/2002 | Kiamco et al. |
| 6,405,779 B1 | 6/2002 | Wittkopf |
| 6,419,217 B1 | 7/2002 | Hartmann et al. |
| 2002/0014509 A1 | 2/2002 | Kitai et al. |

OTHER PUBLICATIONS

U.S. patent application Ser. No. 10/115,323, filed Apr. 3, 2002, Ripley et al., co-pending application.

U.S. patent application Ser. No. 10/115,731, filed Apr. 3, 2002, Mlinar, J. R., co-pending application.

U.S. patent application Ser. No. 10/115,733, filed Apr. 3, 2002, Mlinar, J. R., co-pending application.

U.S. patent application Ser. No. 10/115,556, filed Apr. 3, 2002, Eaton et al., co-pending application.

U.S. patent application Ser. No. 10/115,537, filed Apr. 3, 2002, Schukar, et al., co-pending application.

U.S. patent application Ser. No. 10/115,513, filed Apr. 3, 2002, Behymer, L. E., co-pending application.

U.S. patent application pub. No., filed May 28, 2003, Roll–Good Fuel Cell Fabrication Processes, Equipment, and Articles Produced From Same.

Roll–Good Fuel Cell Fabrication Processes, Equipment, and Articles Produced from Same.

* cited by examiner

APPARATUS AND METHOD FOR AUTOMATICALLY STACKING FUEL CELL MATERIAL LAYERS

FIELD OF THE INVENTION

The present invention relates generally to automated stacking of relatively thin porous and non-porous material layers and, more particularly, to apparatuses and methods for automatically stacking porous and non-porous layers of a fuel cell during fuel cell assembly.

BACKGROUND OF THE INVENTION

Various apparatuses have been developed to stack layers of varying materials when constructing a stack of such material layers. Conventional stacking apparatuses typically employ suction cups or a vacuum to releasably engage and transport layers of a given material during a stacking operation. Although such conventional arrangements may be satisfactory in certain applications, implementing known approaches for stacking relatively thin materials having varying porosity renders conventional arrangements unworkable.

Moreover, it is often desirable to automate, either partially or completely, a number of processes of a stacking operation. Many conventional material handling, transporting, and stacking apparatuses and methods are not well suited for a high degree of automation, particularly stacking processes which have tight positional tolerance requirements.

There is a need for improved material layer stacking apparatuses and methodologies. There is a further need for such apparatuses and methodologies that can safely and precisely position and stack material layers of varying porosity in an automated assembly environment, such as in an automated fuel cell assembly plant. The present invention fulfills these and other needs.

SUMMARY OF THE INVENTION

The present invention is directed to methods and apparatuses for facilitating automated stacking of various material layers having varying porosity. In accordance with the present invention, the material layers subject to automated stacking typically include at least one substantially non-porous material layer and at least one substantially porous material layer. A method of stacking such material layers according to an embodiment of the present invention involves applying vacuum to a first porous material layer to stabilize the first porous material layer relative to a support structure. One or both of the support structure and a non-porous material layer are moved to establish contact between the non-porous material layer and the first porous material layer. The first porous material layer and the non-porous material layer define a sub-assembly. While applying vacuum to the sub-assembly, one or both of the support structure and a second material layer are moved to establish contact between the second material layer and the non-porous material layer. Vacuum applied to the sub-assembly maintains positional stability of the first porous material layer and non-porous material layer relative to the support structure while the second material layer is moved into contact with the non-porous material layer. Vacuum is subsequently removed to facilitate transporting of the material layer stack.

In accordance with one embodiment directed to automated fuel cell assembly, a number of fuel cell layers of varying porosity are processed, including at least a first fluid transport layer (first FTL), a second fluid transport layer (second FTL), and a membrane. The first and second FTLs are substantially porous and the membrane is substantially non-porous. The automated stacking process involves applying vacuum to the first FTL to stabilize the first FTL relative to a support structure. One or both of the support structure and the membrane are moved to establish contact between the membrane and the first FTL, the first FTL and the membrane defining a sub-assembly. While applying vacuum to the sub-assembly, one or both of the support structure and the second FTL are moved to establish contact between the second FTL and the membrane. The application of vacuum to the sub-assembly maintains positional stability of the first FTL and membrane relative to the support structure while the second FTL is moved into contact with the membrane. Vacuum is subsequently removed to facilitate transport of the fuel cell stack for downstream processing.

According to another embodiment, automated stacking of fuel cell layers is facilitated with use of a transportable fixture assembly comprising a first fixture and a second fixture. The first and second fixtures include at least one substantially porous region, respectively. The automated stacking process involves moving one or both of a first FTL and the first fixture to establish contact between the first FTL and the first fixture. One or both of the first fixture and a membrane are moved to establish contact between the membrane and the first FTL. The first FTL in contact with the first fixture and the membrane defines a first sub-assembly. One or both of the second fixture and a second FTL are moved to establish contact between the second fixture and the second FTL. The second FTL in contact with the second fixture defines a second sub-assembly. While respectively applying vacuum to the first and second fixtures, one or both of the first and second fixtures are moved to establish contact between the second FTL and the membrane. The application of vacuum to the first sub-assembly maintains positional stability of the first FTL and membrane relative to the first fixture, and the application of vacuum to the second sub-assembly maintains positional stability of the second FTL relative to the second fixture. Vacuum is subsequently removed from the first sub-assembly and the second sub-assembly to allow for the transport of the fuel cell stack for downstream processing.

In accordance with yet another embodiment of the present invention, an automated process of stacking and bonding fuel cell layers involves moving a second surface of a first FTL into contact with a first support of a bonding press. Vacuum is applied to the second surface of the first FTL to stabilize the first FTL on the first support. The membrane is moved into contact with a first surface of the first FTL, the first FTL and the membrane defining a first sub-assembly. Vacuum is applied to the first sub-assembly to maintain positional stability of the first FTL and membrane relative to the first support. Vacuum is applied to a first surface of the second FTL to stabilize the second FTL on a second support of the bonding press. One or both of the first and second supports are moved to establish contact between a first surface of the membrane and a second surface of the second FTL. The first FTL, membrane, and second FTL are bonded together to produce a bonded fuel cell assembly. The automated stacking and bonding processes may be employed to stack and bond material layers of varying types and porosity.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
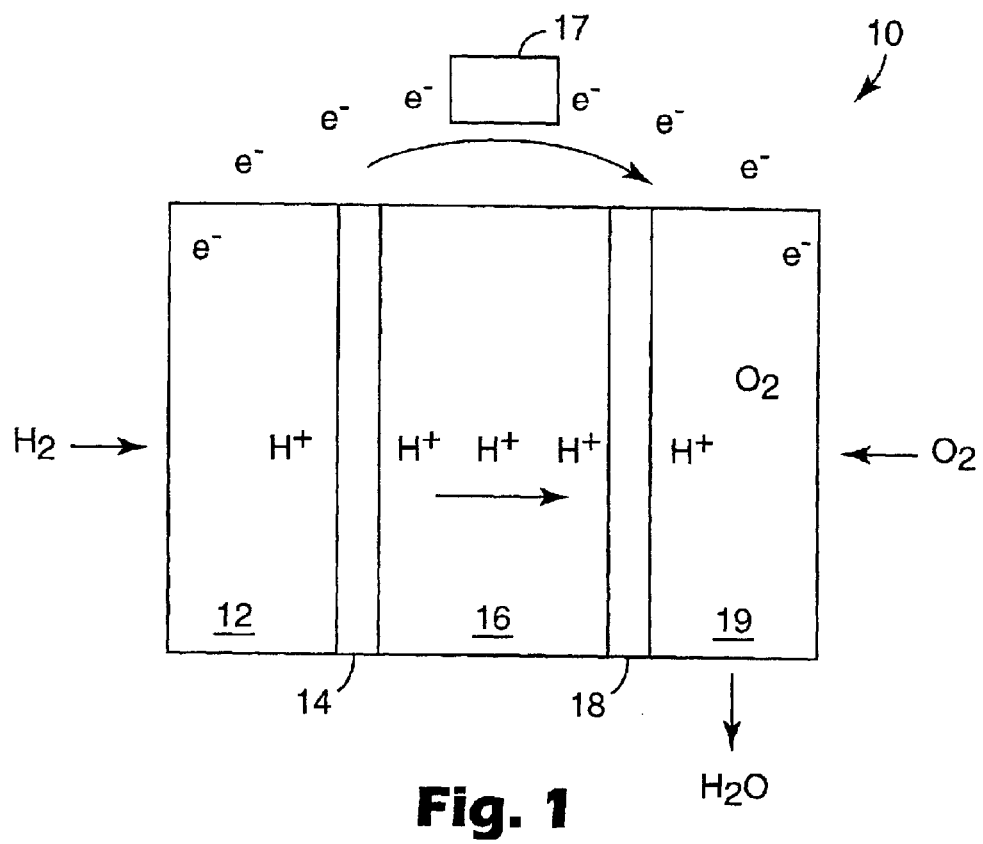
FIG. 1 is an illustration of a fuel cell and its constituent layers.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

A stacking method and apparatus of the present invention advantageously provide for safe and precise handling of relatively thin material layers during a stacking operation, such as a picking and placing operation for example. A method and apparatus according to the principles of the present invention are particularly well suited for picking and placing porous and non-porous material layers to produce a stack of such material layers. In addition to handling materials of varying porosity, a stacking method and apparatus of the present invention can be implemented to handle and stack thin material layers of varying brittleness. A high degree of accuracy is achievable during picking, placing, and stacking operations for applications which have tight locational tolerance requirements for building stacks of thin material layers.

In accordance with one application, an apparatus and method of the present invention can be implemented to facilitate automated stacking of material layers defining a fuel cell or a portion of a fuel cell. A fuel cell is an electrochemical device that combines hydrogen fuel and oxygen from the air to produce electricity, heat, and water.

Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

A typical fuel cell is depicted in FIG. 1. The fuel cell 10 shown in FIG. 1 includes a first fluid transport layer 12 adjacent an anode 14. Adjacent the anode 14 is an electrolyte membrane 16. A cathode 18 is situated adjacent the electrolyte membrane 16, and a second fluid transport layer 19 is situated adjacent the cathode 18. In operation, hydrogen fuel is introduced into the anode portion of the fuel cell 10, passing through the first fluid transport layer 12 and over the anode 14. At the anode 14, the hydrogen fuel is separated into hydrogen ions ($H^+$) and electrons ($e^-$).

The electrolyte membrane 16 permits only the hydrogen ions or protons to pass through the electrolyte membrane 16 to the cathode portion of the fuel cell 10. The electrons cannot pass through the electrolyte membrane 16 and, instead, flow through an external electrical circuit in the form of electric current. This current can power an electric load 17, such as an electric motor, or be directed to an energy storage device, such as a rechargeable battery.

Oxygen flows into the cathode side of the fuel cell 10 via the second fluid transport layer 19. As the oxygen passes over the cathode 18, oxygen, protons, and electrons combine to produce water and heat.

Individual fuel cells, such as that shown in FIG. 1, can be combined with a number of other fuel cells to form a fuel cell stack. The number of fuel cells within the stack determines the total voltage of the stack, and the surface area of each of the cells determines the total current. The total electrical power generated by a given fuel cell stack can be determined by multiplying the total stack voltage by total current.

An apparatus and method of the present invention can be implemented to facilitate automated stacking of material layers in the construction of fuel cells of varying technologies. For example, the handling and stacking principles of the present invention may be applied to construct proton exchange membrane (PEM) fuel cells. PEM fuel cells operate at relatively low temperatures (about 175 degrees F.), have high power density, can vary their output quickly to meet shifts in power demand, and are well suited for applications where quick startup is required, such as in automobiles for example.

The proton exchange membrane used in a PEM fuel cell is a thin plastic sheet that allows hydrogen ions to pass through it. The membrane is coated on both sides with highly dispersed metal or metal alloy particles (e.g., platinum or platinum/ruthenium) that are active catalysts. The electrolyte used is typically a solid organic polymer polyperfluorosulfonic acid. Use of a solid electrolyte is advantageous because it reduces corrosion and management problems.

Hydrogen is fed to the anode side of the fuel cell where the catalyst encourages the hydrogen ions to release electrons and become hydrogen ions (protons). The electrons travel in the form of an electric current that can be utilized before it returns to the cathode side of the fuel cell where oxygen has been introduced. At the same time, the protons diffuse through the membrane to the cathode, where the hydrogen ions are recombined and reacted with oxygen to produce water.

According to one PEM fuel cell construction, a PEM layer is sandwiched between a pair of fluid transport layers, such as diffuse current collectors or gas diffusion layers for example. An anode is situated between a first FTL and the membrane, and a cathode is situated between the membrane and a second FTL. In one configuration, a PEM layer is fabricated to include an anode catalyst coating on one surface and a cathode catalyst coating on the other surface. According to another configuration, the first and second FTLs are fabricated to include an anode and cathode catalyst coating, respectively. In yet another configuration, an anode catalyst coating can be disposed partially on the first FTL and partially on one surface of the PEM, and a cathode catalyst coating can be disposed partially on the second FTL and partially on the other surface of the PEM. The five layer construct defined by the first FTL/anode/PEM/cathode/second FTL is referred to as a membrane electrode assembly (MEA).

The FTLs are typically fabricated from a carbon fiber paper or non-woven material. Depending on the product construction, the FTLs can have carbon particle coatings on one side. The FTLs, as discussed above, can be fabricated to include or exclude a catalyst coating. The FTLs, according to this product construction, are both porous and brittle. A material layer handling and stacking approach consistent with the principles of the present invention is particularly well suited for safely and accurately transporting and positioning thin, brittle fuel cell layers, such as FTLs for example.

Direct methanol fuel cells (DMFC) are similar to PEM cells in that they both use a polymer membrane as the electrolyte. In a DMFC, however, the anode catalyst itself draws the hydrogen from liquid methanol fuel, eliminating the need for a fuel reformer. DMFCs typically operate at a temperature between 120–190 degrees F.

Molten carbonate fuel cells (MCFC) use a liquid solution of lithium, sodium and/or potassium carbonates, soaked in a matrix for an electrolyte. MCFCs operate at about 1,200 degrees F. The high operating temperature is needed to achieve sufficient conductivity of the electrolyte. Because of this high temperature, noble metal catalysts are not required for the cell's electrochemical oxidation and reduction processes. MCFCs are typically operated on hydrogen, carbon monoxide, natural gas, propane, landfill gas, marine diesel, and simulated coal gasification products.

A solid oxide fuel cell (SOFC) typically employs a hard ceramic material of solid zirconium oxide and a small amount of ytrria, instead of a liquid electrolyte, allowing operating temperatures to reach 1,800 degrees F.

In regenerative fuel cells, water is separated into hydrogen and oxygen by a solar-powered electrolyser. The hydrogen and oxygen are fed into the regenerative fuel cell which generates electricity, heat, and water. The water is then recirculated back to the solar-powered electrolyser and the process is repeated.

A protonic ceramic fuel cell (PCFC) employs a ceramic electrolyte material that exhibits high protonic conductivity at elevated temperatures. PCFCs operate at about 1,300 degrees F. PCFCs can operate at high temperatures and electrochemically oxidize fossil fuels directly to the anode. Gaseous molecules of the hydrocarbon fuel are absorbed on the surface of the anode in the presence of water vapor, and hydrogen ions are efficiently stripped off to be absorbed into the electrolyte, with carbon dioxide as the primary reaction product. These and other fuel cell technologies can be constructed and stacked by use of a handling and stacking apparatus and methodology in accordance with the present invention.

In the figures, there is illustrated apparatuses for automatically stacking a number of relatively thin material layers, such as material layers of a fuel cell. It is often necessary or desirable to handle and transport various types of porous and non-porous material layers using the same apparatus when automatically constructing stacks of such material layers. In the construction of a PEM fuel cell, for example, a non-porous PEM layer is sandwiched between a pair of porous FTLs. Although it would appear that conventional vacuum techniques could be employed to automate construction of the FTL/PEM/FTL stack, those skilled in the art will readily appreciate that the non-porous nature of the sandwiched PEM layer renders such conventional techniques unworkable or impractical.

By way of example, assuming that a FTL/PEM/FTL stack has been constructed, it is typically necessary to move this stack from the stacking station to one or more other process stations without disturbing the alignment of the FTL and PEM layers within the stack. It can be appreciated that disrupting the positioning of the FTL and PEM layers within the stack can result in significant downstream processing inaccuracies and unacceptable fuel cell rejection rates. Applying vacuum via the first FTL or the second FTL of the FTL/PEM/FTL structure is effective for stabilizing only the first FTL/PEM layers or the second FTL/PEM layers, due to the non-porous nature of the PEM layer. As such, the application of vacuum to the FTL/PEM/FTL stack via the first or second FTL layer is ineffectual when attempting to move the entire stack and maintain positional alignment amongst the layers within the stack. A material layer stacking apparatus and methodology of the present invention overcomes these and other deficiencies associated with conventional approaches, and provides additional benefits when constructing stacks of porous and non-porous material layers.

Figure 2:
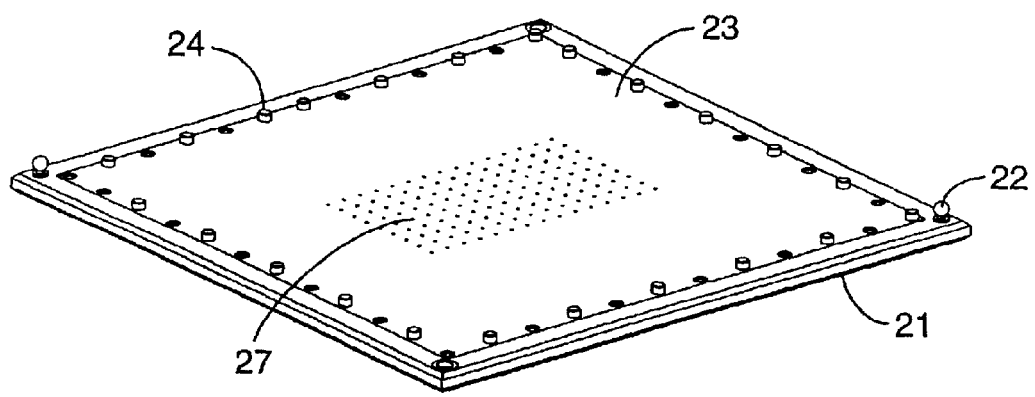
FIGS. 2–4 illustrate features of a two-part fixture assembly well suited for facilitating automated stacking of fuel cell layers in accordance with an embodiment of the present invention.
Figure 3:
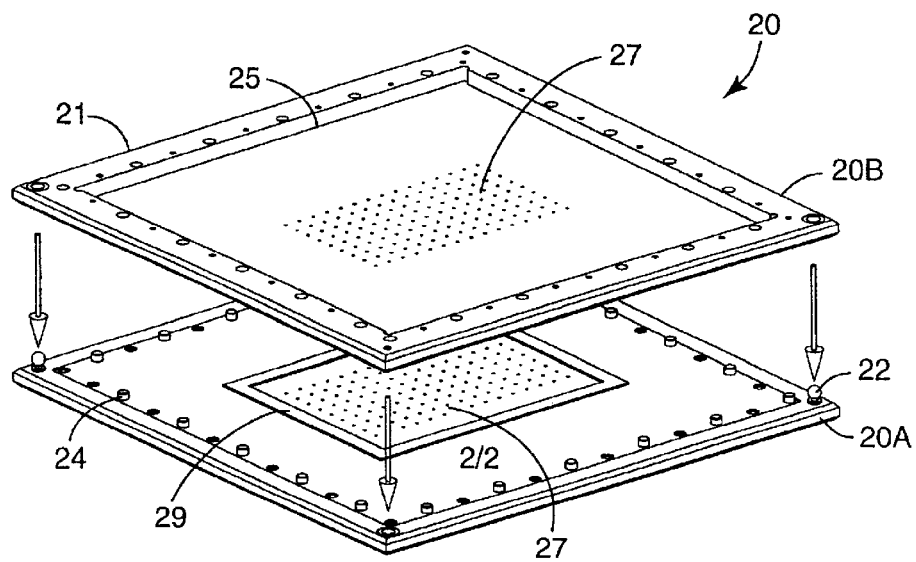
Figure 4:
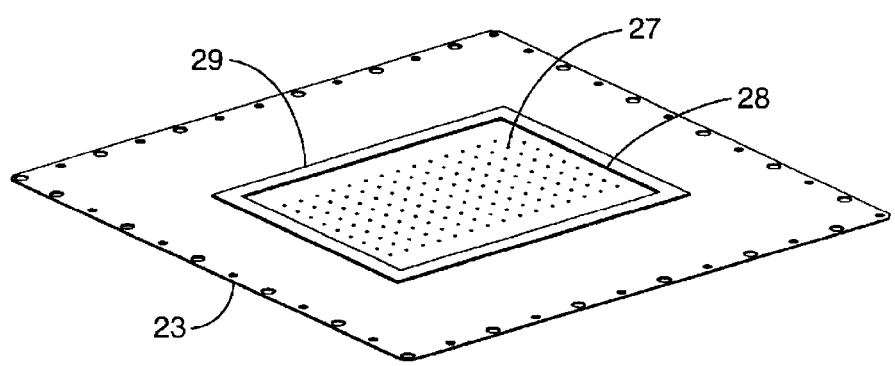

In accordance with one embodiment of the present invention, a transportable fixture assembly is used to facilitate automated stacking of porous and non-porous material layers, such as porous and non-porous fuel cell layers. FIGS. 2–4 are views of an exemplary fixture assembly 20 which may be employed in accordance with this embodiment. The fixture assembly 20 advantageously provides a structure within which a multiplicity of porous and non-porous material layers can be stacked and positional alignment of the layers can be maintained during construction of the stack. In addition, the fixture assembly provides a structure for transporting a stack of material layers from one processing station to various other processing stations, while maintaining positional alignment of the layers during transport and processing.

According to the embodiment shown in FIGS. 2–4, the fixture assembly 20 is a two-part assembly which includes a first fixture 20A and a second fixture 20B. The first and second fixtures 20A, 20B each include a frame 21, a plate 23 situated within a cutout portion 25 of the frame 21, and a substantially porous region 27 provided on the plate 23. The porous region 27 may define a depression or recess 28 relative to the plane of the plate 23. Screws 24 are used to mount the plate 23 to the frame 21.

The porous region 27 of the plate 23 is adapted to receive one or more material layers and to facilitate formation of a vacuum between the plate 23 and the material layers(s) residing within porous region 27. A stop arrangement 29 protrudes from each plate 23 of the first and second fixtures 20A, 20B. Each stop arrangement 29 is situated peripheral to the porous region 27 and the material layer when the material layer is received within the porous region 27.

In one configuration, the respective stop arrangements 29 of the first and second fixtures 20A, 20B, when brought into contact, define a cavity adapted to effect compression of the material layers residing within the cavity when the first fixture 20A and the second fixture 20B are brought into contact with one another under pressure. An alignment arrangement 22 is employed to maintain registration of the first and second fixtures 20A and 20B when brought into contact with one another. Other features and advantages of fixture assembly 20 are described in commonly owned copending application entitled "Fixture Pallet Apparatus for Automated Assembly of Fuel Cell Material Layers," filed concurrently herewith under Attorney Docket No. 57422US002, which is hereby incorporated herein by reference.

A stacking apparatus and methodology according to an embodiment of the present invention will now be described with reference to FIGS. 5–11. For purpose of illustration, and not of limitation, the embodiment shown in FIGS. 5–11 will generally be described in the context of automated fuel cell assembly and, in particular, automated assembly of PEM fuel cells. It is to be understood that the following description is presented to provide an understanding of the present invention and not to limit the manner and applications in which a stacking apparatus and methodology of the present invention may be employed. For example, the stacking apparatus and methodology depicted in FIGS. 5–11 can be implemented in a wide variety of applications in which porous and non-porous material layers are stacked and subject to transport from one processing station to another. Moreover, the stacking apparatus and methodology of the present invention may be employed to construct fuel cells of varying technologies, and is not limited to use in constructing PEM fuel cells.

Figure 5:
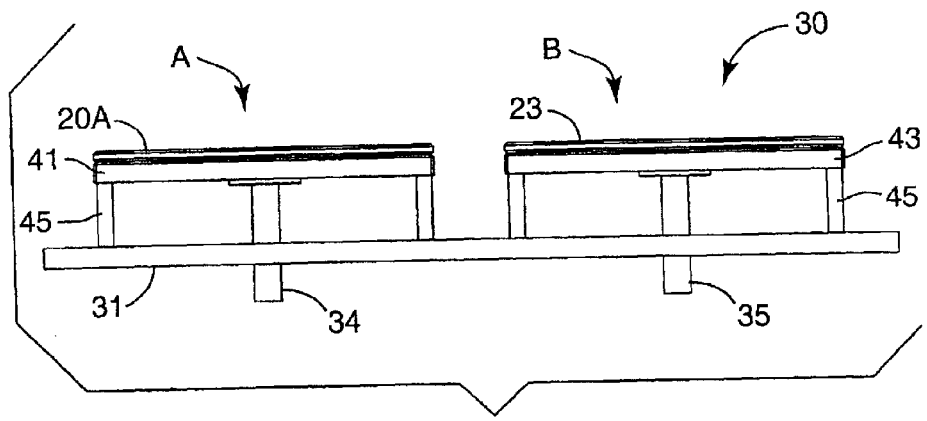
FIGS. 5–11 illustrate various processes of an automated material layer stacking operation in accordance with an embodiment of the present invention.

Turning now to FIGS. 5–11, there is shown a number of illustrations depicting various processing stages wherein a fuel cell is constructed from constituent material layers, including porous and non-porous material layers, in accordance with the principles of the present invention. With reference to FIG. 5, a stacking assembly 30 includes a build nest assembly comprising two build nests, nest A and nest B. As shown, nests A and B are secured to a common base 31. Nest A includes a platform 41 supported from the base 31 by support members 45. The platform 41 includes a vacuum port (not shown) that receives a vacuum apparatus 34. The vacuum apparatus 34 can be connected to a vacuum system to controllably evacuate and, if needed, pressurize the vacuum port of platform 41. Evacuation of the vacuum port of platform 41 provides for the production of a vacuum between the platform 41 and a material layer in proximity with the vacuum port of platform 41.

Also shown in FIG. 5 is a first fixture 20A of a two part fixture assembly 20, such as that shown in FIGS. 2–4. First fixture 20A is shown positioned on platform of nest A, such that the porous region 27 of first fixture 20A is in fluid communication with the vacuum port of platform 41. In this configuration, a layer of material placed at or within the porous region 27 of first fixture 20A is subject to the force of a vacuum produced between the platform 41 and the material layer via the vacuum port of platform 41 and the vacuum system coupled thereto.

Nest B of the stacking assembly 30 shown in FIG. 5 includes a platform 43 supported from the base 31 by support members 45. The platform 43 includes a vacuum port (not shown) that receives a vacuum apparatus 35. The vacuum apparatus 35 can be connected to the same or different vacuum system as vacuum apparatus 34 to controllably evacuate and, if needed, pressurize the vacuum port of platform 43.

Residing on the platform 43 is a vacuum distribution plate 23. The vacuum distribution plate 23 includes a porous region which is in fluid communication with the vacuum apparatus 35 via the vacuum port of platform 43. Evacuation of the vacuum port of platform 43 provides for the production of a vacuum between the vacuum distribution plate 23 and a material layer in proximity with the porous region of vacuum distribution plate 23. Although considered desirable for many applications, platform 43 need not be equipped with vacuum distribution plate 23.

Figure 6:
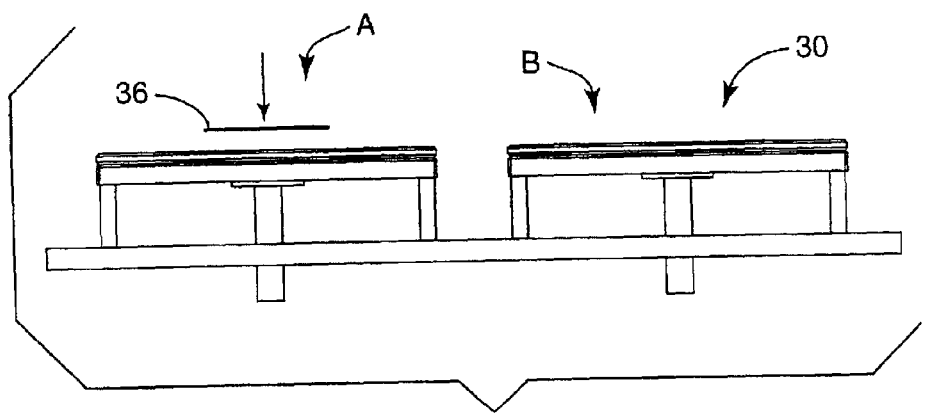

FIG. 6 illustrates placement of a first fluid transport layer 36, such as an anode FTL of a PEM fuel cell, onto the first fixture 20A supported on platform 41. A transport mechanism, such as a pick-and-place apparatus, is typically employed to pick a first fluid transport layer 36 from a stack of such layers 36 as part of automated fuel cell assembly, and place the first fluid transport layer 36 onto the porous region 27 of the first fixture 20A. An exemplary transport mechanism for picking fuel cell layers and other porous and non-porous material layers from stacks of such material layers and accurately placing same on platforms, such as the first fixture 20A on platform 41 and vacuum distribution plate 23 on platform 43, is described in commonly owned copending application entitled "Apparatus and Method for Singulating Porous Fuel Cell Layers Using Adhesive Tape Pick Head," filed concurrently herewith under Attorney Docket No. 57424US002, which is hereby incorporated herein by reference. The vacuum system coupled to vacuum apparatus 34 can be actuated to maintain positional stability of the first fluid transport layer 36 residing on the porous region 27 of the first fixture 20A.

Figure 7:
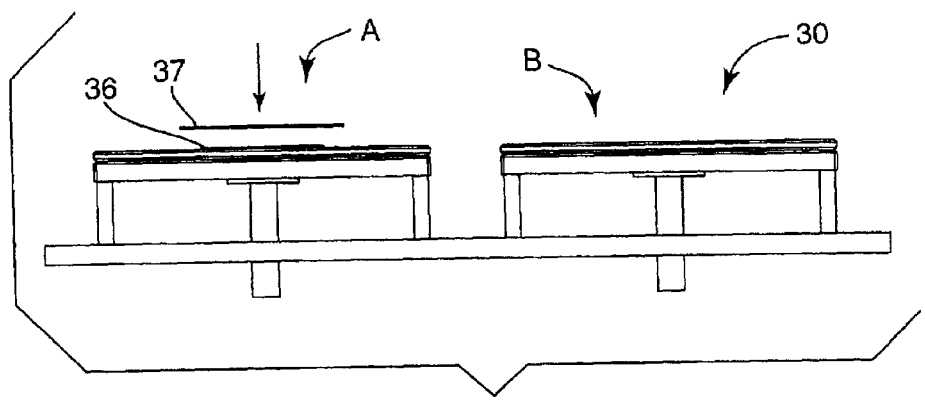

FIG. 7 depicts placement of a membrane layer 37, such as a PEM layer, into contact with the first fluid transport layer 36. The membrane layer 37 is typically picked and transported from a stack of membrane layers 37 as part of automated fuel cell assembly. During transport and placement of the membrane layer 37 at this stage, vacuum is preferably maintained on the first fluid transport layer 36 to ensure positional stability and alignment of the first fluid transport layer 36 as the membrane layer 37 is placed on the first fluid transport layer 36. Alternatively, a vacuum stabilized adhesive tape pick head fixture, such as that disclosed in the previously incorporated application identified under Attorney Docket No. 57424US002, can be used to transport and place the membrane layer 37 into contact with the first fluid transport layer 36 with high precision.

Figure 8:
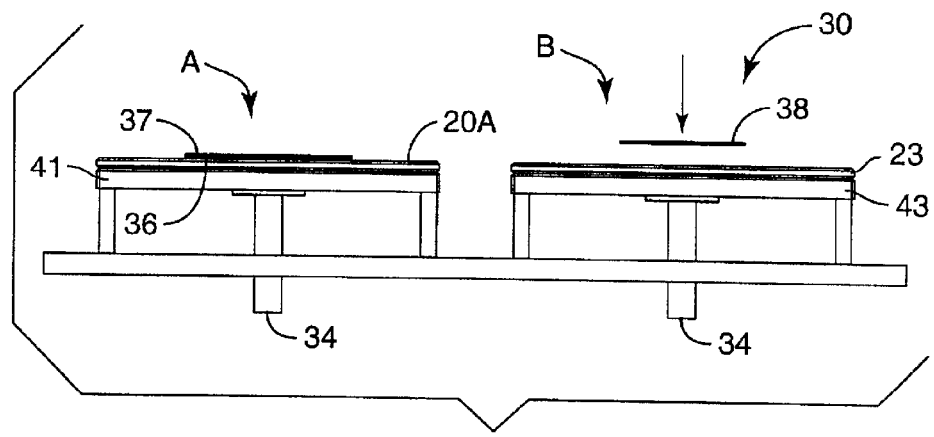

FIG. 8 shows the membrane layer 37 in contact with the first fluid transport layer 36. As discussed previously, the first fluid transport layer 36 is porous. At this stage, vacuum is preferably maintained at the porous region 27 of the first fixture 20A to ensure positional stability and alignment of the first fluid transport layer 36 and the membrane layer 37 now resting on the first fluid transport layer 36.

FIG. 8 further shows placement of a second fluid transport layer 38 onto the vacuum distribution plate 23 residing on platform 43. One skilled in the art will readily appreciate that it is undesirable to place the second fluid transport layer 38 directly on the membrane 37 in applications in which tight positional tolerances are to be maintained. One skilled in the art will readily appreciate that the non-porous membrane layer 37 renders the vacuum produced at the porous region 27 of the first fixture 20A ineffectual for stabilizing the position of the second fluid transport layer 38 when placed into contact with the membrane layer 37. In order to provide the requisite positional alignment and stabilization of the second fluid transport layer 38 relative to the membrane layer 37, the inventors have developed and employed a method of using the nest B apparatus in cooperation with the nest A apparatus to achieve the desired positional alignment and stabilization of the second fluid transport layer 38 relative to the membrane layer 37.

Figure 9:
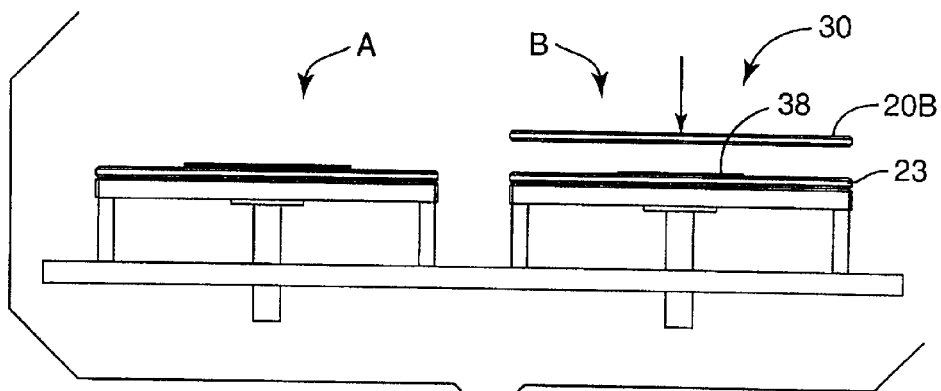

As is shown in FIGS. 8 and 9, the second fluid transport layer 38 is placed onto the vacuum distribution plate 23 of nest B. The vacuum system is preferably actuated to produce a vacuum between the second fluid transport layer 38 and the vacuum distribution plate 23 residing on platform 43. With the second fluid transport layer 38 positionally stabilized on the vacuum distribution plate 23, the second fixture 20B is moved into alignment relative to the second fluid transport layer 38. As previously described, the second fixture 20B includes a porous region 27. The second fixture 20B is preferably releasably affixed to the transport mechanism via a vacuum and displaced by the transport mechanism such that the porous region 27 of the second fixture 20B is moved into alignment with the second fluid transport layer 38.

The second fixture 20B is displaced toward the vacuum distribution plate 23 until the second fixture 20B moves into contact or close proximity with nest B. Vacuum is pulled through the displacement region 27 of the second fixture 20B and vacuum at the vacuum distribution plate 23 is removed, such that the second fluid transport layer 38 is positionally stabilized by the vacuum apparatus of the transport mechanism.

Figure 10:
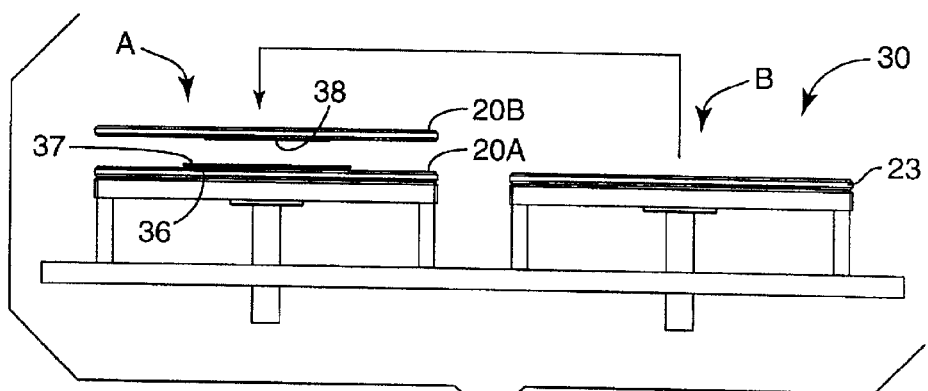

As is shown in FIG. 10, the second fixture 20B and second fluid transport layer 38 are moved as a unit from nest B by the transport mechanism, via vacuum and mechanical gripping, and into alignment with nest A. At this stage, the first fluid transport layer 36 and membrane layer 37 are preferably positionally stabilized via a vacuum pulling through porous region 27 of the first fixture 20A, while the second fluid transport layer 38 is positionally stabilized via a vacuum pulling through the porous region 27 of the second fixture 20B. The second fixture 20B is moved by the transport mechanism so that the second fluid transport layer 38 establishes contact with the membrane layer 37.

Figure 11:
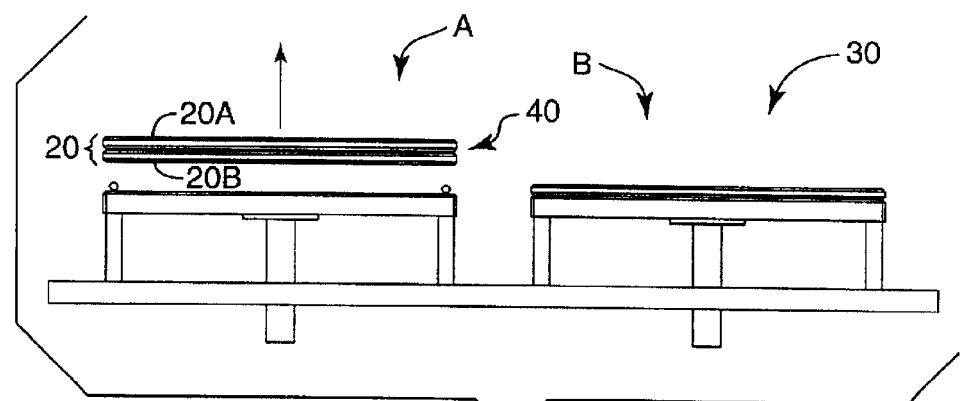

At this stage, as shown in FIG. 11, the second fixture 20B is resting on the first fixture 20A, thereby completing stacking of the various fuel cell layers constituting an MEA. Vacuum is removed from the first and second fixtures 20A, 20B. The weight of the second fixture 20A resting on the first fixture 20B is sufficient to maintain positional alignment and stability of the MEA layers. The fixture assembly 20 may be removed automatically or manually and transported to a subsequent processing station, such as a bonding station. A new first fixture 20A is placed onto platform 41 and the processes described above with reference to FIGS. 5–11 are repeated to construct another MEA with use of another fixture assembly 20.

Figure 12:
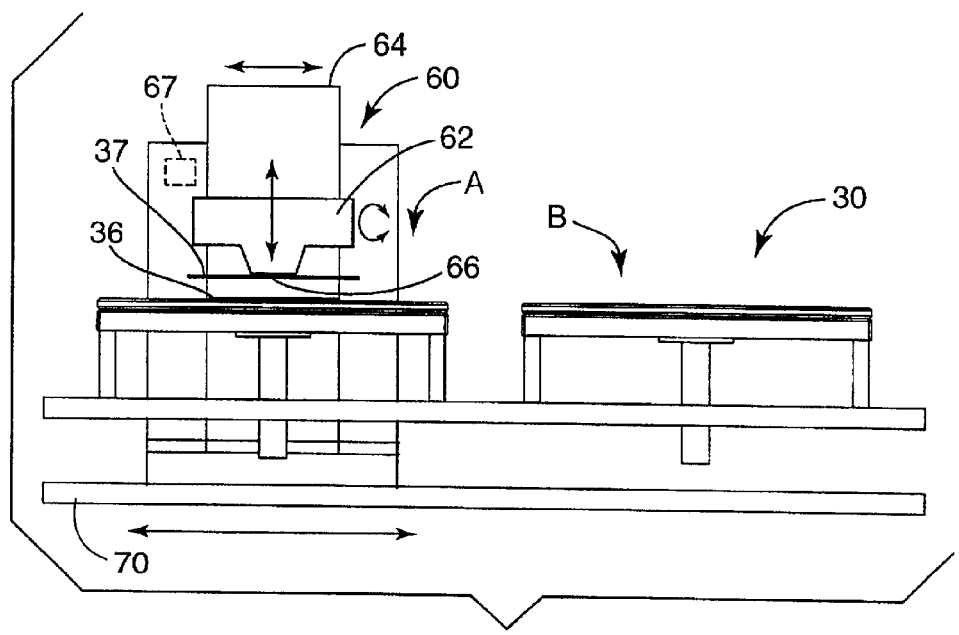
FIG. 12 is a depiction of a processor controlled transport mechanism that facilitates automated stacking of material layers in accordance with an embodiment of the present invention.

Referring now to FIG. 12, an embodiment of a transport mechanism 60 is shown which can be employed to facilitate transporting and positioning of various material layers when constructing a stack of such material layers in accordance with the principles of the present invention. The transport mechanism 60 is shown to include a vertical support 64 from which a pick head assembly 62 is supported. The pick head assembly 62 includes a pick head 66 which is used to releasably engage, transport, and accurately position material layers, such as fuel cell layers, during a stacking operation.

The pick head 66 can be configured to include one or more vacuum ports for producing a vacuum having sufficient force to releasably engage various types of material layers. In one application, the pick head 66 can be configured to include one or more adhesive tape head assemblies that are particularly well suited for picking and placing porous and non-porous fuel cell layers during automated fuel cell stack construction. An exemplary pick head 66 which employs an adhesive tape system in combination with a vacuum system is disclosed in the previously incorporated application entitled "Apparatus and Method for Singulating Porous Fuel Cell Layers Using Adhesive Tape Pick Head," filed under Attorney Docket No. 57424US002. Although a single transport mechanism 60 is shown in FIG. 12, it will be appreciated that multiple transport mechanisms 60 can be employed, each with similar or different types of pick heads and pick head configurations.

By way of example, and as will be further described with reference to FIGS. 15–17, a first transport mechanism can be employed to handle, transport, and position FLTs 36, 38 during automated fuel cell assembly, and a second transport mechanism can be employed to handle, transport, and position membrane layers 37. The first and second transport mechanisms can be the same or different in terms of configuration. For example, the first transport mechanism can incorporate a vacuum stabilized adhesive tape pick head fixture(s), such as that disclosed in the previously incorporated application identified under Attorney Docket No. 57424US002, to transport and position FLTs 36, 38. The second transport mechanism can incorporate the same vacuum stabilized adhesive tape pick head fixture(s) or, alternatively, can incorporate a vacuum pick head fixture in view of the substantially non-porous nature of the membrane layers 37.

The pick head assembly 62, shown in the embodiment of FIG. 12, is mounted on the vertical support 64 to permit vertical displacement under the control of a controller 67 or other type of processor. The controller 67 can be mounted on-board the transport mechanism 60 or, alternatively, can be situated remote from the transport mechanism 60. A servomotor drive is preferably controlled by the controller 67 to vertically displace the pick head assembly 62 relative to the vertical support 64. The pick head assembly 62 is also displaceable horizontally by employment of a servomotor drive controlled by controller 67. Further, a servomotor drive can be employed to permit controlled upward and downward tilting of the pick head assembly 62. The pick head assembly 62 may thus be controlled by controller 67 with multiple degrees of freedom to releasably engage, transport, and precisely position material layers during a stacking operation.

The transport mechanism 60 is mounted for horizontal movement along a transport frame 70 extending between nest A and nest B of the stacking assembly 30. The transport frame 70 may include the rack of a rack and pinion arrangement, a rail or channel frame to allow for rolling or sliding action between the transport mechanism 60 and transport frame 70 or other known arrangement for permitting movement of the transport mechanism 60 between nest A and nest B of the stacking assembly 30. For example, a belt or cable can be used along with a traction drive. Linear motors can also be used. Movement of the transport mechanism 60 can be effected by a suitable motor drive, such as a servomotor drive, under control of controller 67. It is understood that other configurations of a transport facility may be employed to perform the functions described herein with reference to the transport mechanism 60.

Figure 13:
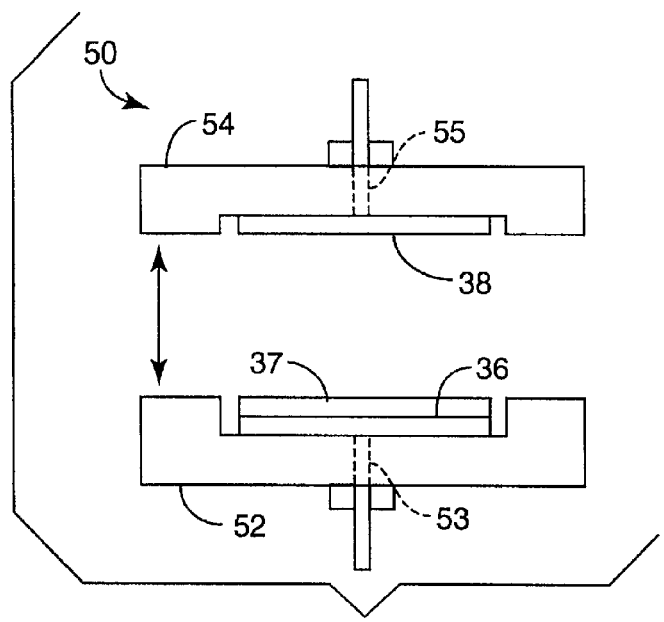
FIGS. 13 and 14 illustrate embodiments of a bonding press adapted for automated stacking and bonding of material layers in accordance with an embodiment of the present invention.

Turning now to FIG. 13, there is illustrated an embodiment of a stacking apparatus 50 in which fuel cell layers or other porous and non-porous material layers can be stacked and bonded in an automated fashion. According to this embodiment, a fixture assembly of the type described above need not be used to facilitate handling of the stacked material layers, although such a fixture assembly can be used if desired. Rather, the various material layers are positioned and stacked within a bonding press. Once properly stacked, the material layer stack is bonded within the bonding press. According to this approach, automated stacking of material layers and bonding of a stack of such layers may be achieved using a common bonding apparatus.

FIG. 13 shows a first support 52 and a second support 54 of a bonding press 50. The first support 52 includes a vacuum distribution plate (not shown) and a vacuum apparatus 53 which can be activated to hold one or more material layers stationary on the first support 52. The second support 54 also includes a vacuum distribution plate (not shown) and a vacuum apparatus 55 which can be activated to hold one or more material layers stationary on the second support 52.

As shown in FIG. 13, and with reference to the previously described fuel cell material layers for use in the following examples, a first fluid transport layer 36 is shown releasably affixed to the vacuum distribution plate of the first support 52 of the bonding press 50 via vacuum apparatus 53. The first fluid transport layer can be positioned onto the first support 52 using a transport mechanism (not shown) of a type previously described. For example, the transport mechanism preferably employs a vacuum assembly to move the first fluid transport layer 36 onto the vacuum distribution plate of the first support 52. The vacuum apparatus is activated to stabilize the first fluid transport layer 36 on the vacuum distribution plate, and the vacuum assembly of the transport mechanism is deactivated.

As is further shown in FIG. 13, a membrane layer 37 is positioned on the first fluid transport layer 36. The membrane layer 37 is typically moved under vacuum into position on the first fluid transport layer 36 by the transport mechanism. The vacuum apparatus 53 is active so that vacuum is pulled through the vacuum distribution plate on the first support 52 to stabilize the first fluid transport layer 36 and membrane layer 37 thereon. The vacuum assembly of the transport mechanism is also deactivated.

The vacuum apparatus 55 of the second support 54 is shown activated in FIG. 13, such that a second fluid transport layer 38 is held in position on the vacuum distribution plate of the second support 54. The second fluid transport layer 38 is typically moved via vacuum into position onto the vacuum distribution plate of the second support 54 by the transport mechanism. The vacuum assembly of the transport mechanism is deactivated after the second fluid transport layer 38 is properly positioned and held under vacuum on the vacuum distribution plate of the second support 54.

The first and second supports 52, 54 are brought into contact with one another, and the five layer fuel cell structure (first fluid transport layer/anode/membrane layer/cathode/second fluid transport layer) is bonded under pressure and temperature using a bonding press. After completion of the bonding process, the bonded fuel cell stack is removed from the bonding press and moved to another station for further processing. The bonded fuel cell can be removed automatically, such as by use of the transport mechanism or other mechanism, or manually.

Figure 14:
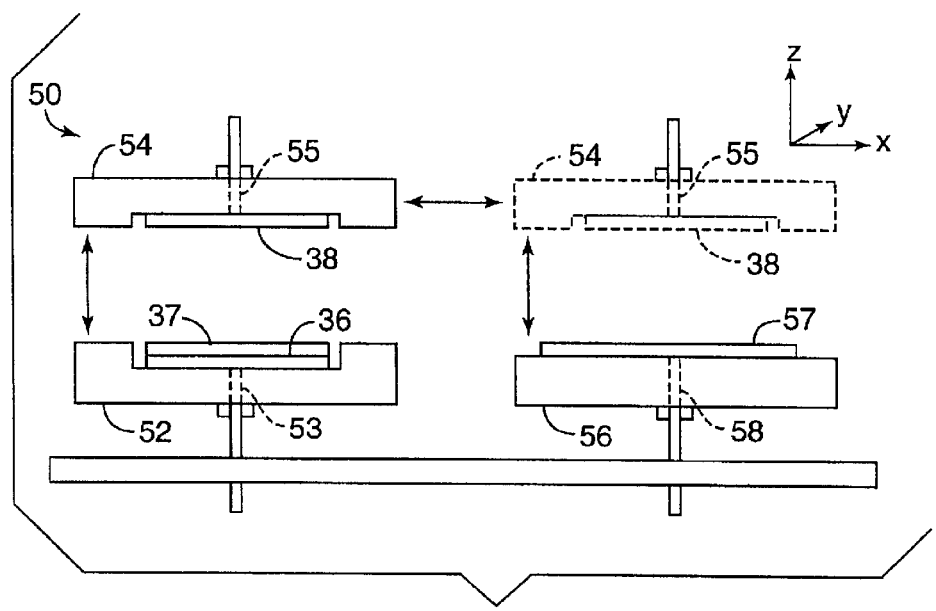

FIG. 14 illustrates another configuration of a bonding press implementation which can eliminate several of the functions performed by the transport mechanism described above. In accordance with the embodiment shown in FIG. 14, one or both of the first support 52 and second support 54 is/are mounted for relative movement along multiple axes. For example, the first and second supports 52, 54 can be moved along a y-axis in order to open and close the bonding press 50. In addition to providing movement along the y-axis, the second support mounting can provide movement in other directions, including, for example, along a x-axis and/or a z-axis. It is understood that movement of the second support 54 need not be orthogonal to the y-axis.

As is shown in FIG. 14, for example, a transport mechanism can be used to position the first fluid transport layer 36 and the membrane layer 37 on the vacuum distribution plate of the first support 52. Alternatively, the first support 52 can be moved out of alignment with the second support 54 relative to the y-axis, such that a stationary transport mechanism can be used to position the first fluid transport layer 36 and the membrane layer 37 on the vacuum distribution plate of the first support 52. The first support 52 can then be moved into a proper position for the bonding phase of the automated process.

Concurrently or subsequent to positioning of the first fluid transport layer 36 and the membrane layer 37 on the vacuum distribution plate of the first support 52, the second support 54 can be moved out of alignment with the first support 54 relative to the y-axis, such that a stationary transport mechanism can be used to position the second fluid transport layer 38 on the vacuum distribution plate of the second support 54. Alternatively, and as shown in FIG. 14, one or both of the second support 54 and staging platform 56 can be moved so that a second fluid transport layer 38 held by vacuum by a vacuum distribution plate 57 (via vacuum assembly 58) on the staging platform 56 establishes contact with the vacuum distribution plate of the second support 54. After the second fluid transport layer 38 is transferred from the vacuum distribution plate 57 of the staging platform 56 to the vacuum distribution plate of the second support 54, the second support 54 can be moved into proper alignment with the first support 52 to enable bonding of the first fluid transport layer 36/membrane layer 37/second fluid transport layer 38 fuel cell structure.

It can be appreciated that relative movement between the various support structures, material layers, and transport mechanism structures can be achieved in various manners to provide contact between appropriate material layers at appropriate stages of a stacking and/or bonding process. For example, nests A and B or particular structures of nests A and B shown in FIGS. 5–12 can be stationary, movable, or include both stationary and movable structures. The transport mechanism that interacts with nests A and B can also have stationary, movable, or both stationary and movable structures. A variety of movable and stationary structures of the bonding and transport apparatuses discussed with reference to FIGS. 13 and 14 are also applicable to these embodiments. As such, it can be seen that stacking, positioning, and bonding apparatuses and methodologies of the present invention are not limited to those depicted in, or described with reference to, the Figures.

Figure 15:
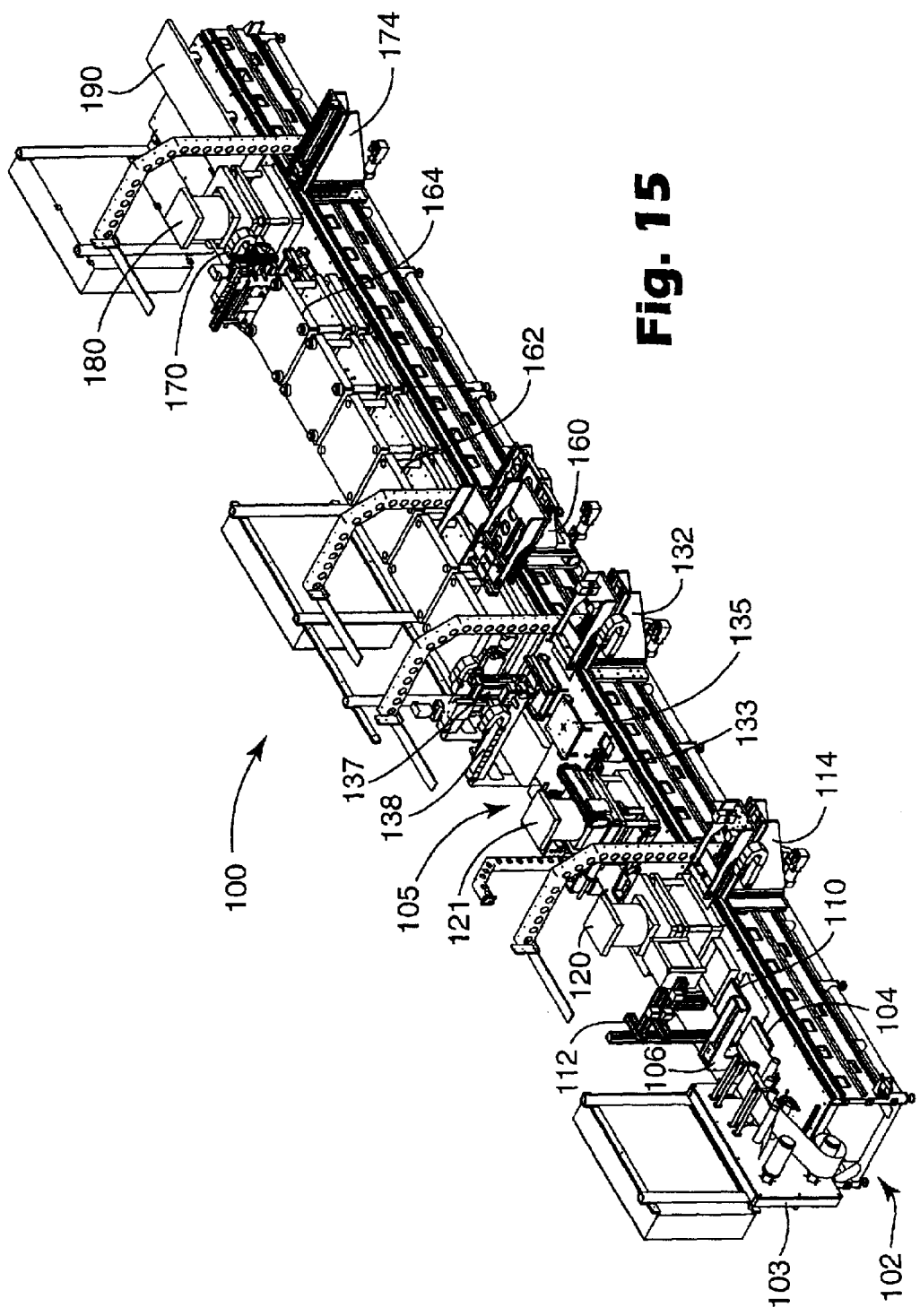
FIGS. 15–17 illustrate an embodiment of an automated fuel cell assembly apparatus for fabricating fuel cells in accordance with the principles of the present invention.
Figure 16:
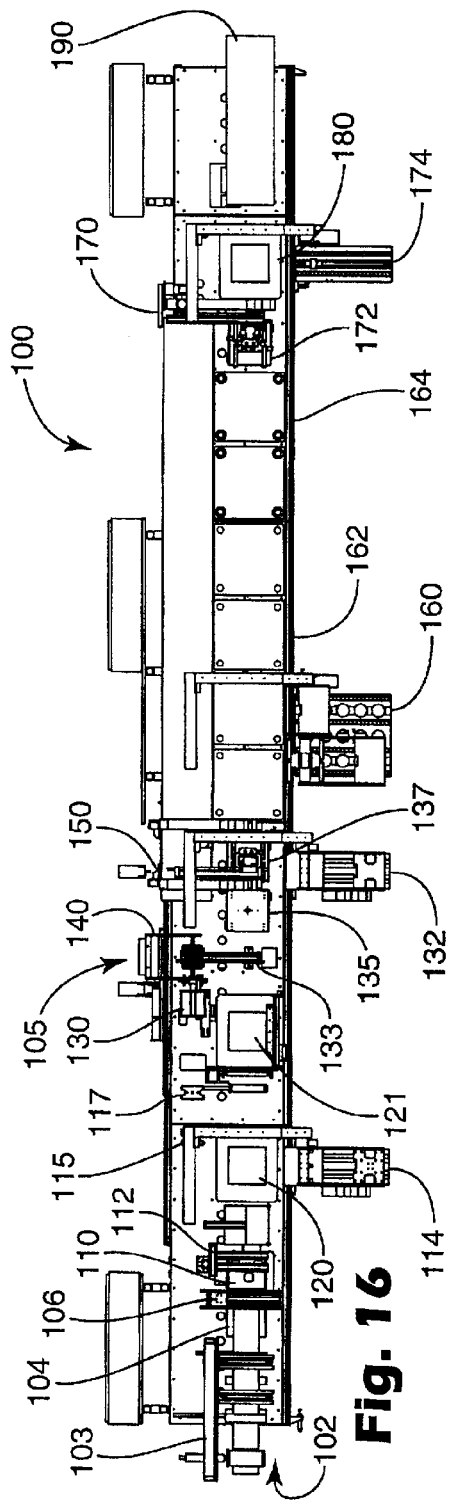
Figure 17:
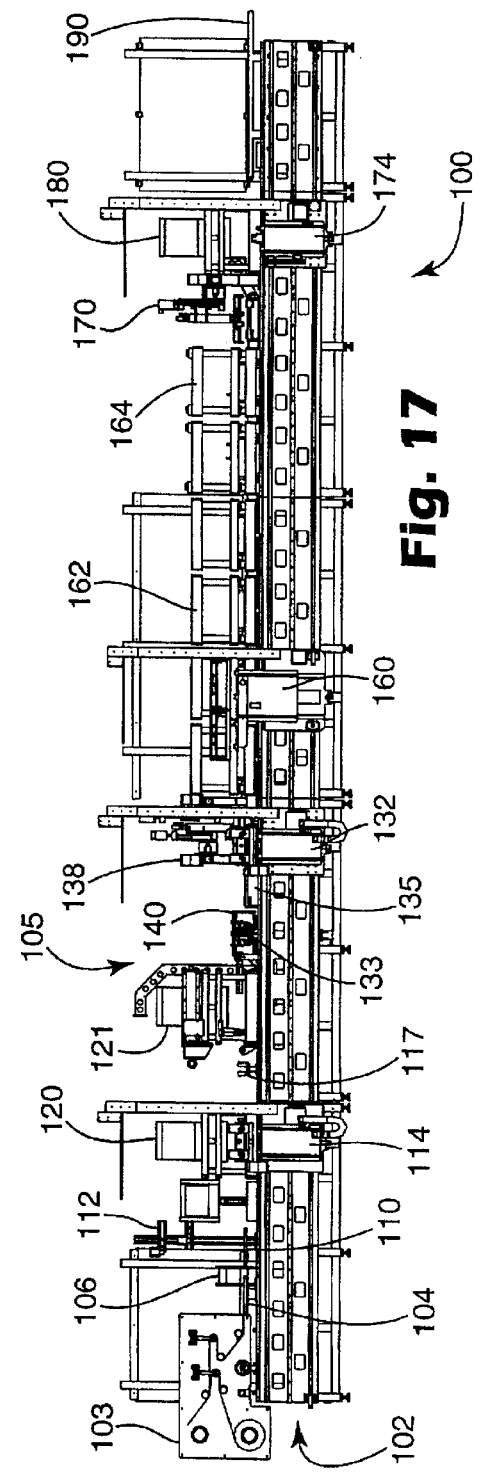

According to a further embodiment of the present invention, and with reference to FIGS. 15–17, there is illustrated an automated fuel cell assembly apparatus 100 for facilitating automated assembly of fuel cells of varying technologies. The automated fuel cell assembly apparatus 100 is a robot assisted automated assembly line by which fuel cell layers are positioned, stacked, bonded, and output in a progressive assembly line fashion, and without operator intervention.

At the start of the fuel cell assembly apparatus 100, a web converting apparatus 102 is situated for converting a web of a fuel cell membrane to individual fuel cell membrane sheets and positioning such membrane sheets to a predetermined orientation for subsequent processing at an adjacent process station of the assembly apparatus 100. A web unwind unit 103 presents an end portion of a membrane web to the web converting apparatus 102.

The web converting apparatus 102 includes a staging station 104 which incorporates a first vacuum assembly coupled to a vacuum distribution plate. The vacuum assembly is selectively actuated during web processing by a controller of the automated fuel cell assembly apparatus 100. A positioning station 110 located adjacent to the staging station 104 includes a controllable positioning table and a second vacuum assembly fluidly coupled to a vacuum distribution plate of the positioning station 110. The vacuum assembly of the positioning station 110 is selectively actuated during web processing by the controller.

The controller may comprise one or several programmable devices, such as processors, that execute program instructions to coordinate the activities of various elements of the fuel cell assembly apparatus 100. The controller(s) may be on-board devices, but may also be located remotely of the fuel cell assembly apparatus 100. If located remotely, the controller(s) are coupled to the fuel cell assembly apparatus 100 using appropriate hardwired or wireless connections.

The positioning station 110 is mounted for movement with multiple degrees of freedom, and can be moved axially with respect to an x-axis and a y-axis, and rotationally about a z-axis under control of a controller. The positioning station 110, under control of the controller, cooperates with a vision system 112 situated above the positioning station 110 to modify the position of an individual membrane sheet after the membrane sheet has been cut from the membrane web by a cutter 106. The vision system 112 includes one or more cameras to detect the orientation of a membrane sheet cut from the membrane web.

A robot 114 is controllably moveable between the staging station 104 and the positioning station 110 via transport frame, and is preferably capable of moving on the transport frame to processing locations beyond the positioning station 110. The robot 114, according to one configuration, is a three axis (x, y, z) servo and pneumatic driven mechanism that is controlled to pull the membrane web via a vacuum chuck to the staging station 104 and positioning station 110, and transfer individual membrane sheets from the positioning station 110 to a downstream process location. The precise orientation of the individual membrane sheet established by the positioning table 110 is maintained as the robot 114 transports individual membrane sheets from the positioning station 110 to the downstream process location.

The web converting apparatus 102 can further include an optical inspection device, such as a camera, for inspecting the membrane web in order to detect defects in the membrane patterns, such as completeness of the catalyst patterns of the web. The inspection device can also include a device for inspecting one or both of a size and a quality of the catalyst patterns of the web.

The separate catalyst sheets produced at the output of the web converting apparatus 102 are accurately positioned by the positioning station 110 for processing at a subsequent processing station. The robot 114 moves into position above a separate catalyst sheet, now repositioned to its predetermined orientation, grasps the separate catalyst sheet via the vacuum chuck, and moves the separate catalyst sheet to a subsequent processing station, all the while maintaining the predetermined orientation of the separate catalyst sheet. A web converting apparatus 102 well suited for incorporation in the automated fuel cell assembly apparatus 100 shown in FIGS. 15–17 is disclosed in commonly owned copending application entitled "Apparatus and Method for Converting a Fuel Cell Membrane Web to Precisely Positioned Membrane Sheets," filed concurrently herewith under Attorney Docket No. 57630US002, which is hereby incorporated herein by reference.

Individual catalyst sheets may be subsequently processed by a cutter station 120. According to one embodiment, the cutter station 120 includes a platen cutting press which incorporates a unique cutting die apparatus. The cutting die apparatus incorporates one or more bearers or stops built into the cutting die. The built-in bearers operate to control the stroke of a cutting press. Integration of one or more stops or bearers built into the cutting die advantageously eliminates the need for stops arranged external of the cutting die. Such external stops are known to be expensive and require careful adjustment by a skilled machinist after each die change. The height of the bearer or bearers of the cutting die apparatus matches the height of the cutting surface of the cutting die apparatus. Because the heights of the bearer and cutting surfaces are matched on the cutting die, the risk of crushing the cutting surface is significantly reduced, if not eliminated.

Each cut membrane layer is subsequently transported from the cutting station 120 to an MEA stacking station 105 at the appropriate time by the robot 114. A cutting die and apparatus well suited for incorporation in the cutting station 120 of the automated fuel cell assembly apparatus 100 shown in FIGS. 15–17 is disclosed in commonly owned copending application entitled "Compliant Cutting Die Apparatus for Cutting Fuel Cell Material Layers," filed concurrently herewith under Attorney Docket No. 57631US002, which is hereby incorporated herein by reference.

The stacking station 105 includes a cathode FTL magazine 115 and an anode FTL magazine 117 within which a respective stack of cathode and anode FTLs are made available for automated stacking at the stacking station 105. An optional gasket unwind/cutter station 121 may be situated adjacent the stacking station 105 for providing a cut gasket that can be incorporated around the MEA structure. The stacking station 105 further includes an FTL robot 140, flip mechanism 130, shuttle 133, and assembly robot 132 that cooperate to handle, transport, and precisely position cathode and anode FTLs moved from respective magazines 115, 117 to build nests 135, 137 in a coordinated manner. Cathode and anode FTLs are moved in an a coordinated manner with respect to movement of cut membrane layers by robot 114 during an MEA stacking operation.

An exemplary pick and place apparatus for destacking/singulating and transporting cathode and anode FTLs with high precision is disclosed in the previously incorporated application entitled "Apparatus and Method for Singulating Porous Fuel Cell Layers Using Adhesive Tape Pick Head," filed under Attorney Docket No. 57424US002. The disclosed apparatus may also be employed to pick and place non-porous membrane layers, although robot 114 employs a vacuum chuck to facilitate membrane layer transport and placement in the embodiment shown in FIGS. 15–17.

Fixture handling robots 150 (load robot) and 170 (unload robot) coordinate the handling, transport, and positioning of fixture pallets that are used to facilitate automated MEA stacking operations. If desired, the fixture handling robot 150 applies silicone to the fixture pallets prior to use in stacking operations. A stacking apparatus and methodology described hereinabove is well suited for stacking cathode FTLs, anode FTLs, and membrane layers during automated MEA construction. Exemplary fixture pallets are disclosed in the previously incorporated application entitled "Fixture Pallet Apparatus for Automated Assembly of Fuel Cell Material Layers," filed concurrently herewith under Attorney Docket No. 57422US002.

A press robot 160 coordinates the transport of MEA stacks through a number of presses, including a heated press 162 and a subsequent cooling press 164. A bonded MEA is then moved by the press robot 160 to a separation apparatus 172. The separation apparatus separates an MEA from its fixture pallet assembly subsequent to MEA bonding. The separation apparatus includes a base, having a first port, which is adapted to receive the fixture pallet assembly, such that the first port is in fluid communication with a first surface of the MEA via a porous region of the first fixture pallet. A gripper assembly, mounted for movement on a support, includes a gripper mechanism and a second port. The second port is in fluid communication with a second surface of the MEA via a porous region of the second fixture pallet. The first and second ports are selectively pressurized and evacuated to separate the first and second surfaces of the MEA from the first and second fixture pallets, respectively. The gripper assembly is adapted to releasably grip a pair of opposing edges of the second fixture pallet and to move the second fixture pallet out of proximity with the first fixture pallet.

According to one approach, the first and second fixture pallets are initially stabilized. While the second fixture pallet is stabilized, the first fixture pallet is pressurized to cause the first surface of the MEA to separate from the first fixture pallet. While the first fixture pallet is stabilized, the second fixture pallet is pressurized to cause the second surface of the MEA to separate from the second fixture pallet. According to one particular approach, a vacuum is applied to the second fixture pallet and second surface of the MEA while pressure is being applied to the first fixture pallet and first surface of the MEA, and, subsequently, vacuum is applied to the first fixture pallet and first surface of the MEA while pressure is being applied to the second fixture pallet and second surface of the MEA. The second fixture pallet is then moved out of proximity with the first fixture pallet to permit removal of the MEA from the first fixture pallet.

A separation apparatus 172 well suited for incorporation in the automated fuel cell assembly apparatus 100 shown in FIGS. 15–17 is disclosed in commonly owned copending application entitled "Apparatus and Method for Separating a Fuel Cell Assembly from a Bonding Fixture," filed concurrently herewith under Attorney Docket No. 57652US002, which is hereby incorporated herein by reference.

Once separated, the bonded MEA is moved by an unload robot 174 to an MEA cutting press 180. After trimming of the MEA by the MEA cutting press 180, the processed MEA is moved to an output conveyor 190 by the unload robot 174. The processed MEA can be packaged or otherwise handled for subsequent incorporation in fuel cell devices.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of automatically stacking a plurality of fuel cell layers with use of a transportable fixture assembly comprising a first fixture and a second fixture, the first and second fixtures comprising at least one substantially porous region, respectively, the plurality of fuel cell layers comprising at least a first fluid transport layer (first FTL), a second fluid transport layer (second FTL), and a membrane, the first and second FTLs being substantially porous and the membrane being substantially non-porous, the method comprising:

moving one or both of the first FTL and the first fixture to establish contact between the first FTL and the first fixture;

moving one or both of the first fixture and the membrane to establish contact between the membrane and the first FTL, the first FTL in contact with the first fixture and the membrane defining a first sub-assembly;

moving one or both of the second fixture and the second FTL to establish contact between the second fixture and the second FTL, the second FTL in contact with the second fixture defining a second sub-assembly;

while respectively applying vacuum to the first and second fixtures, moving one or both of the first and second fixtures to establish contact between the second FTL and the membrane, the application of vacuum to the first sub-assembly maintaining positional stability of the first FTL and membrane relative to the first fixture, and the application of vacuum to the second sub-assembly maintaining positional stability of the second FTL relative to the second fixture;

removing vacuum from the first sub-assembly; and removing vacuum from the second sub-assembly.

2. The method of claim 1, wherein moving one or both of the first FTL and the first fixture comprises applying vacuum to the first FTL while moving one or both of the first FTL and the first fixture.

3. The method of claim 1, wherein the first fixture is stationary, and moving one or both of the first FTL and the first fixture comprises applying vacuum to the first FTL and moving the first FTL into contact with the first fixture.

4. The method of claim 1, wherein moving one or both of the first fixture and the membrane comprises applying vacuum to the first fixture and the first FTL while moving one or both of the first fixture and the membrane.

5. The method of claim 1, wherein moving one or both of the first fixture and the membrane comprises applying vacuum to the membrane while moving one or both of the first fixture and the membrane.

6. The method of claim 1, wherein moving one or both of the second FTL and the second fixture comprises applying vacuum to the second FTL while moving one or both of the second FTL and the second fixture.

7. The method of claim 1, wherein the second FTL is stationary, and moving one or both of the second FTL and the second fixture comprises applying vacuum to the second FTL and the second fixture and moving the second fixture into contact with the second FTL.

8. The method of claim 1, wherein the first sub-assembly is stationary, and moving one or both of the first and second fixtures comprises moving the second sub-assembly into contact with the first sub-assembly to establish contact between the second FTL and the membrane.

9. A method of automatically stacking a plurality of fuel cell layers, the plurality of fuel cell layers comprising at least a first fluid transport layer (first FTL), a second fluid transport layer (second FTL), and a membrane, the first and second FTLs being substantially porous and the membrane being substantially non-porous, the method comprising:

applying vacuum to the first FTL to stabilize the first FTL relative to a support structure;

moving one or both of the support structure and the membrane to establish contact between the membrane and the first FTL, the first FTL and the membrane defining a sub-assembly;

while applying vacuum to the sub-assembly, moving one or both of the support structure and the second FTL to establish contact between the second FTL and the membrane, the application of vacuum to the sub-assembly maintaining positional stability of the first FTL and membrane relative to the support structure; and removing vacuum from the sub-assembly.

10. The method of claim 9, further comprising:

while applying vacuum to a first surface of the first FTL, moving the first FTL to the support structure;

applying vacuum to a second surface of the first FTL to stabilize the first FTL relative to the support structure; and removing vacuum from the first surface of the first FTL.

11. The method of claim 9, wherein the support structure is stationary, the method further comprising, while applying vacuum to the first FTL, moving the first FTL into contact with the support structure.

12. The method of claim 9, wherein moving one or both of the support structure and the membrane comprises applying vacuum to the membrane while moving one or both of the support structure and the membrane.

13. The method of claim 9, wherein the support structure is stationary, and moving one or both of the support structure and the membrane comprises, while applying vacuum to the membrane, moving the membrane into contact with the support structure.

14. The method of claim 9, wherein moving one or both of the support structure and the second FTL comprises applying vacuum to the second FTL while moving one or both of the support structure and the second FTL.

15. The method of claim 9, wherein the support structure is stationary, and moving one or both of the support structure and the second FTL comprises applying vacuum to the second FTL while moving the second FTL into contact with the support structure.

16. A method of automatically stacking a plurality of material layers comprising at least one substantially non-porous material layer and at least one substantially porous material layer, the method comprising:

applying vacuum to a first porous material layer to stabilize the first porous material layer relative to a support structure;

moving one or both of the support structure and a non-porous material layer to establish contact between the non-porous material layer and the first porous material layer, the first porous material layer and the non-porous material layer defining a sub-assembly;

while applying vacuum to the sub-assembly, moving one or both of the support structure and a second material layer to establish contact between the second material layer and the non-porous material layer, the application of vacuum to the sub-assembly maintaining positional stability of the first porous material layer and non-porous material layer relative to the support structure; and removing vacuum from the sub-assembly.

17. The method of claim 16, wherein the second material layer is substantially porous.

18. The method of claim 16, wherein the second material layer is substantially non-porous.

19. The method of claim 16, further comprising:

while applying vacuum to a first surface of the first porous material layer, moving the first porous material layer to the support structure;

applying vacuum to a second surface of the first porous material layer to stabilize the first porous material layer relative to the support structure; and removing vacuum from the first surface of the first porous material layer.

20. The method of claim 16, wherein the support structure is stationary, and moving one or both of the first porous material layer and the support structure comprises applying vacuum to the first porous material layer and moving the first porous material layer into contact with the support structure.

21. The method of claim 16, wherein moving one or both of the support structure and the non-porous material layer comprises applying vacuum to the non-porous material layer while moving one or both of the support structure and the non-porous material layer.

22. The method of claim 16, wherein the support structure is stationary, and moving one or both of the support structure and the non-porous material layer comprises while applying vacuum to the non-porous material layer, moving the non-porous material layer into contact with the support structure.

23. The method of claim 16, wherein moving one or both of the support structure and the second material layer comprises applying vacuum to the second material layer while moving one or both of the support structure and the second material layer.

24. The method of claim 16, wherein the support structure is stationary, and moving one or both of the support structure and the second material layer comprises applying vacuum to the second material layer while moving the second material layer into contact with the support structure.

25. A method of automatically stacking and bonding a plurality of fuel cell layers, the plurality of fuel cell layers comprising at least a first fluid transport layer (first FTL), a second fluid transport layer (second FTL), and a membrane, the first and second FTLs being substantially porous and the membrane being substantially non-porous, the method comprising:

moving a second surface of the first FTL into contact with a first support of a bonding press;

applying vacuum to the second surface of the first FTL to stabilize the first FTL on the first support;

moving the membrane into contact with a first surface of the first FTL, the first FTL and the membrane defining a first sub-assembly;

applying vacuum to the first sub-assembly to maintain positional stability of the first FTL and membrane relative to the first support;

applying vacuum to a first surface of the second FTL to stabilize the second FTL on a second support of the bonding press;

moving one or both of the first and second supports to establish contact between a first surface of the membrane and a second surface of the second FTL; and bonding together the first FTL, membrane, and second FTL to produce a bonded fuel cell assembly.

26. The method of claim 25, further comprising automatically removing the bonded fuel cell assembly subsequent to bonding together the first FTL, membrane, and second FTL.

27. The method of claim 25, further comprising using vacuum to move the second surface of the first FTL into contact with the first support, and using vacuum to move the membrane into contact with the first surface of the first FTL.

28. An apparatus for automatically stacking a plurality of fuel cell layers with use of a transportable fixture assembly comprising a first fixture and a second fixture, the first and second fixtures comprising at least one substantially porous region, respectively, the plurality of fuel cell layers comprising at least a first fluid transport layer (first FTL), a second fluid transport layer (second FTL), and a membrane, the first and second FTLs being substantially porous and the membrane being substantially non-porous, the apparatus comprising:

a first support comprising a first vacuum apparatus;

a second support comprising a second vacuum apparatus;

a transfer mechanism; and a controller, the controller coordinating automatic stacking operations including:

controlling the transfer mechanism to move the first FTL into contact with the first fixture positioned on the first support;

controlling the transfer mechanism to move the membrane into contact with the first FTL, the first FTL in contact with the first fixture and the membrane defining a first sub-assembly;

controlling the transfer mechanism to move the second fixture into contact with the second FTL positioned on the second support, the second FTL in contact with the second fixture defining a second sub-assembly;

controlling the first and second vacuum assemblies to respectively apply vacuum to the first and second fixtures, and controlling the transfer mechanism to move the second sub-assembly relative to the first sub-assembly to establish contact between the second FTL and the membrane, the application of vacuum to the first sub-assembly maintaining positional stability of the first FTL and membrane relative to the first fixture, and the application of vacuum to the second sub-assembly maintaining positional stability of the second FTL relative to the second fixture;

controlling the first vacuum apparatus to remove vacuum from the first sub-assembly; and controlling the second vacuum apparatus to remove vacuum from the second sub-assembly.

29. The apparatus of claim 28, wherein the transfer mechanism comprises a third vacuum apparatus, and the controller controls the third vacuum apparatus of the transfer mechanism to move the first FTL under vacuum into contact with the first fixture.

30. The apparatus of claim 28, wherein the transfer mechanism comprises a third vacuum apparatus, and the controller controls the third vacuum apparatus of the transfer mechanism to move the membrane under vacuum into contact with the first FTL.

31. The apparatus of claim 28, wherein the transfer mechanism comprises a third vacuum apparatus, and the controller controls the third vacuum apparatus of the transfer mechanism to move the second sub-assembly relative to the first sub-assembly to establish contact between the second FTL and the membrane.

32. An apparatus for automatically stacking a plurality of fuel cell layers, the plurality of fuel cell layers comprising at least a first fluid transport layer (first FTL), a second fluid transport layer (second FTL), and a membrane, the first and second FTLs being substantially porous and the membrane being substantially non-porous, the apparatus comprising:

a support structure comprising a first vacuum apparatus;

a transfer mechanism; and a controller, the controller coordinating automatic stacking operations including:

controlling the transfer mechanism to move the first FTL into contact with the support structure;

controlling the first vacuum to apply vacuum to the first FTL to stabilize the first FTL on the support structure;

controlling the transfer mechanism to move the membrane into contact with the first FTL, the first FTL and the membrane defining a sub-assembly, the application of vacuum to the sub-assembly via the first vacuum apparatus maintaining positional stability of the first FTL and membrane relative to the support structure;

controlling the transfer mechanism to move the second FTL into contact with the membrane; and controlling the first vacuum apparatus to remove vacuum from the sub-assembly.

33. The apparatus of claim 32, wherein the transfer mechanism comprises a second vacuum apparatus, the controller controlling the transfer mechanism and second vacuum apparatus to move the first FTL under vacuum into contact with the support structure.

34. The apparatus of claim 32, wherein the transfer mechanism comprises a second vacuum apparatus, the controller controlling the transfer mechanism and second vacuum apparatus to remove vacuum applied to the first FTL and controlling the first vacuum apparatus to apply vacuum to the first FTL to stabilize the first FTL on the support structure.

35. The apparatus of claim 32, wherein the transfer mechanism comprises a second vacuum apparatus, the controller controlling the transfer mechanism and second vacuum apparatus to move the membrane under vacuum into contact with the first FTL.

36. The apparatus of claim 32, wherein the transfer mechanism comprises a second vacuum apparatus, the controller controlling the transfer mechanism and second vacuum apparatus to move the second FTL under vacuum into contact with the membrane.

37. The apparatus of claim 32, wherein the transfer mechanism comprises a second vacuum apparatus, the controller controlling the first and second vacuum apparatuses to remove vacuum from the sub-assembly and second FTL, respectively.

38. An apparatus for automatically stacking and bonding a plurality of fuel cell layers, the plurality of fuel cell layers comprising at least a first fluid transport layer (first FTL), a second fluid transport layer (second FTL), and a membrane, the first and second FTLs being substantially porous and the membrane being substantially non-porous, the apparatus comprising:

a bonding press comprising a first support and a second support;

a first vacuum apparatus proximate the first support;

a second vacuum apparatus proximate the second support;

a transfer mechanism comprising a third vacuum apparatus; and a controller, the controller coordinating automatic stacking operations including:

controlling the transfer mechanism and third vacuum apparatus to apply a vacuum to a first surface of the first FTL and to move the first FTL under vacuum into contact with the first support;

controlling the first vacuum apparatus to apply a vacuum to a second surface of the first FTL to stabilize the first FTL on the first support, and controlling the third vacuum apparatus of the transfer mechanism to thereafter remove vacuum from the first surface of the first FTL;

controlling the transfer mechanism and third vacuum apparatus to apply a vacuum to a first surface of the membrane and to move the membrane so that a second surface of the membrane contacts the first surface of the first FTL, the controller controlling removal of vacuum from the first surface of the membrane thereafter, the first FTL and the membrane defining a first sub-assembly;

controlling the first vacuum apparatus to maintain the application of vacuum to the first sub-assembly to maintain positional stability of the first FTL and membrane relative to the first support;

controlling the second vacuum to apply a vacuum to a first surface of the second FTL to stabilize the second FTL on the second support of the bonding press;

controlling the bonding press to move one or both of the first and second supports to establish contact between the first surface of the membrane and a second surface of the second FTL; and controlling the bonding press to bond together the first FTL, membrane, and second FTL to produce a bonded fuel cell assembly.

39. The apparatus of claim 38, wherein the controller further controls removal of the respective application of vacuum after bonding together the first FTL, membrane, and second FTL.

40. The apparatus of claim 38, wherein the transfer mechanism automatically removes the bonded fuel cell assembly subsequent to bonding together the first FTL, membrane, and second FTL.

41. An apparatus for automatically stacking a plurality of material layers comprising at least one substantially non-porous material layer and at least one substantially porous material layer, the apparatus comprising:

a support structure comprising a first vacuum apparatus;

a transfer mechanism; and a controller, the controller coordinating automatic stacking operations including:

controlling the transfer mechanism to move a first porous material layer into contact with the support structure;

controlling the first vacuum to apply vacuum to the first porous material layer to stabilize the first porous material layer on the support structure;

controlling the transfer mechanism to move a non-porous material layer into contact with the first porous material layer, the first porous material layer and the non-porous material layer defining a sub-assembly, the application of vacuum to the sub-assembly via the first vacuum apparatus maintaining positional stability of the first porous material layer and non-porous material layer relative to the support structure;

controlling the transfer mechanism to move a second porous material layer into contact with the non-porous material layer; and controlling the first vacuum apparatus to remove vacuum from the sub-assembly.

42. The apparatus of claim 41, wherein the support structure is stationary.

43. The apparatus of claim 41, wherein the support structure is moveable under control of the controller.

* * * * *

UNITED STATES PATENT AND TRADEMARK OFFICE
CERTIFICATE OF CORRECTION

PATENT NO. : 6,756,146 B2
DATED : June 29, 2004
INVENTOR(S) : Mlinar, John R.

It is certified that error appears in the above-identified patent and that said Letters Patent is hereby corrected as shown below:

Title page,
Item [56], References Cited, OTHER PUBLICATIONS, "Ripley et al." reference, delete "10/115,323" and insert in place thereof -- 10/115,523 --.

Column 6,
Line 46, after "assembly" insert -- 20 --.

Column 7,
Line 54, after "platform" insert -- 41 --.

Column 11,
Line 25, after "layer" insert -- 36 --.
Line 30, after "apparatus" insert -- 53 --.

Column 14,
Line 51, after "moved in" delete "an".

Signed and Sealed this

Thirtieth Day of August, 2005

JON W. DUDAS
*Director of the United States Patent and Trademark Office*